United States Patent
Wu et al.

(10) Patent No.: US 12,506,820 B2
(45) Date of Patent: *Dec. 23, 2025

(54) FOLDABLE MODULE AND FOLDABLE ELECTRONIC DEVICE

(71) Applicant: HUAWEI TECHNOLOGIES CO., LTD., Shenzhen (CN)

(72) Inventors: Weifeng Wu, Dongguan (CN); Ding Zhong, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,922

(22) Filed: Jul. 3, 2024

(65) Prior Publication Data

US 2024/0357026 A1    Oct. 24, 2024

Related U.S. Application Data

(63) Continuation of application No. 17/561,370, filed on Dec. 23, 2021, now Pat. No. 12,063,319, which is a
(Continued)

(30) Foreign Application Priority Data

Jun. 27, 2019   (CN) .......................... 201910568672.5

(51) Int. Cl.
*H04M 1/02*     (2006.01)
*G06F 1/16*     (2006.01)

(52) U.S. Cl.
CPC .......... *H04M 1/022* (2013.01); *G06F 1/1616* (2013.01); *G06F 1/1681* (2013.01)

(58) Field of Classification Search
CPC ..... G06F 1/1681; G06F 1/1616; H04M 1/022
See application file for complete search history.

(56) References Cited

U.S. PATENT DOCUMENTS 6,009,568 A * 1/2000 Miyazaki ............... A47K 13/12
                                              4/240
6,115,886 A * 9/2000 Fujita ................. H04M 1/0216
                                              343/702
(Continued)

FOREIGN PATENT DOCUMENTS

CN         102168716 A      8/2011
CN         202545559 U     11/2012
(Continued)

*Primary Examiner* — Jeffrey O'Brien
(74) *Attorney, Agent, or Firm* — Leydig, Voit & Mayer, Ltd.

(57) ABSTRACT

A foldable module is provided, including a first connection part, a first pin, a first drive ring, and a first spring. A first pin hole is disposed on the first connection part, and the first pin passes through the first drive ring, the first pin hole, and the first spring. A first convex part and a first concave part are disposed between the first drive ring and the first connection part, and the first convex part is located between the first spring and the first concave part, or the first concave part is located between the first spring and the first convex part. When the first connection part rotates, the first convex part slides out of the first concave part. In a folding or unfolding process, the first convex part slides out of the first concave part, to provide damping force for unfolding or folding.

20 Claims, 7 Drawing Sheets

Related U.S. Application Data continuation of application No. PCT/CN2020/097878, filed on Jun. 24, 2020.

(56) References Cited

U.S. PATENT DOCUMENTS

| | | | | |
|---|---|---|---|---|
| 7,515,707 B2* | 4/2009 | Ka | ........................ | G06F 1/1683 455/575.4 |
| 7,565,717 B2* | 7/2009 | Duan | ................. | H04M 1/0216 16/303 |
| 7,738,930 B2* | 6/2010 | Petrella | ................ | H04M 1/022 16/221 |
| 8,615,848 B2* | 12/2013 | Mitsui | ................... | G06F 1/1681 16/354 |
| 8,938,855 B2* | 1/2015 | Ahn | ...................... | G06F 1/1681 361/679.01 |
| 9,027,205 B2* | 5/2015 | Ahn | ...................... | H04M 1/022 16/354 |
| 11,340,661 B2* | 5/2022 | Yen | ........................ | G06F 1/1616 |
| 11,467,633 B2* | 10/2022 | Liao | ........................ | G06F 1/1641 |
| 11,615,720 B2* | 3/2023 | Park | ...................... | H04M 1/022 361/679.01 |
| 11,675,395 B2* | 6/2023 | Park | ...................... | G06F 1/1652 361/679.01 |
| 11,726,530 B2* | 8/2023 | Kang | ................... | H04B 1/3833 361/679.27 |
| 2005/0155182 A1* | 7/2005 | Han | ...................... | H04M 1/022 16/336 |
| 2010/0071159 A1* | 3/2010 | Myung | ................. | H04M 1/022 16/303 |
| 2013/0091666 A1* | 4/2013 | Carmonius | ........... | F16C 11/103 16/328 |
| 2013/0152342 A1* | 6/2013 | Ahn | ...................... | G06F 1/1681 16/354 |
| 2013/0219661 A1 | 8/2013 | Ge | | |
| 2017/0131741 A1 | 5/2017 | In-Sung et al. | | |
| 2021/0355988 A1* | 11/2021 | Cheng | ................... | G06F 1/1681 |
| 2022/0004232 A1* | 1/2022 | Wu | ........................ | G06F 1/1652 |
| 2022/0174830 A1* | 6/2022 | Li | ......................... | H04M 1/022 |
| 2022/0282754 A1* | 9/2022 | Zhang | ................... | G06F 1/1681 |
| 2022/0346258 A1* | 10/2022 | Liu | ...................... | H05K 5/0017 |
| 2023/0032983 A1* | 2/2023 | Feng | ..................... | H04M 1/022 |
| 2023/0102766 A1* | 3/2023 | Huang | ................. | H04M 1/022 455/575.3 |

FOREIGN PATENT DOCUMENTS

| | | | | |
|---|---|---|---|---|
| CN | 202790058 U | 3/2013 | | |
| CN | 103167071 A | 6/2013 | | |
| CN | 104132059 A | 11/2014 | | |
| CN | 207304635 U | 5/2018 | | |
| CN | 210830134 U | 6/2020 | | |
| CN | 117128236 A | * 11/2023 | ............. | F16C 11/04 |
| JP | 2006046382 A | 2/2006 | | |
| JP | 2008075747 A | 4/2008 | | |
| JP | 2008121795 A | 5/2008 | | |
| JP | 2013072442 A | 4/2013 | | |
| JP | 2018112835 A | 7/2018 | | |
| KR | 1020170103268 A | 9/2017 | | |

* cited by examiner

FOLDABLE MODULE AND FOLDABLE ELECTRONIC DEVICE

CROSS-REFERENCE TO RELATED APPLICATIONS

This application is a continuation of U.S. patent application Ser. No. 17/561,370, filed on Dec. 23, 2021, which is a continuation of International Application No. PCT/CN2020/097878, filed on Jun. 24, 2020, which claims priority to Chinese Patent Application No. 201910568672.5, filed on Jun. 27, 2019. All of the aforementioned patent applications are hereby incorporated by reference in their entireties.

TECHNICAL FIELD

Embodiments of this application relate to the field of electronic device technologies, and in particular, to a foldable module and a foldable electronic device.

BACKGROUND

With the gradual development of foldable screen technologies, foldable electronic devices appear. The foldable electronic device generally includes a first supporting piece, a second supporting piece, and a foldable screen. The foldable screen covers the first supporting piece and the second supporting piece, and the first supporting piece may be folded together with or unfolded relative to the second supporting piece.

The first supporting piece and the second supporting piece are usually connected by using a foldable module. The foldable module includes a rotating shaft, an abutting spring, a first drive ring, and a second drive ring. The abutting spring, the first drive ring, and the second drive ring are sleeved on the rotating shaft. A first drive surface is disposed on a side wall of the rotating shaft, a second drive surface is disposed on an inner wall of the first drive ring, and the first drive surface cooperates with the second drive surface to drive the first drive ring to rotate when the rotating shaft rotates. The first drive ring is located between the second drive ring and the abutting spring, and the abutting spring abuts against the first drive ring, to press the first drive ring onto the second drive ring. A convex part is disposed on a surface that is of the first drive ring and that faces the second drive ring, and a concave part that cooperates with the convex part is disposed on the second drive ring. The rotating shaft and the first supporting piece are connected through transmission, so that when the first supporting piece is twisted, the rotating shaft is driven to rotate, and the rotating shaft drives the first drive ring to rotate, so that relative rotation occurs between the first drive ring and the second drive ring, and the convex part slides out of the concave part to provide damping force or the convex part slides into the concave part to implement automatic unfolding or folding of the first supporting piece.

However, when the first supporting piece is twisted, the first drive surface on the rotating shaft and the second drive surface on the first drive ring drive the first drive ring to rotate. Because there is a gap between the first drive surface and the second drive surface, transmission accuracy is insufficient.

SUMMARY

Embodiments of this application are intended to provide a foldable module and a foldable electronic device, to resolve a technical problem in a related technology that transmission accuracy is insufficient because there is a gap between a first drive surface on a rotating shaft and a second drive surface on a first drive ring when the first drive surface and the second drive surface drive the first drive ring to rotate.

According to a first aspect, this application discloses a foldable module, including a first connection part, a first pin, a first drive ring, and a first spring. A first pin hole is disposed on the first connection part, the first pin passes through the first drive ring, the first pin hole, and the first spring, a first convex part and a first concave part are disposed between the first drive ring and the first connection part, the first convex part is located between the first spring and the first concave part, or the first concave part is located between the first spring and the first convex part, and the first convex part is embedded in the first concave part; and when the first connection part rotates, the first convex part slides out of the first concave part.

Based on the foregoing technical content, the first pin hole is disposed on the first connection part, the first pin passes through the first drive ring, the first pin hole, and the first spring, the first convex part and the first concave part are disposed between the first drive ring and the first connection part, and the first spring abuts against the first drive ring or the first connection part, so that the first convex part is embedded in the first concave part. In a folding or unfolding process, the first convex part slides out of the first concave part, to provide damping force for unfolding or folding. Compared with a manner in which a first drive surface on a rotating shaft cooperates with a second drive surface on the first drive ring to drive the first drive ring to rotate, the first connection part may directly drive the first convex part and the first concave part to move relative to each other, so that transmission accuracy is improved.

In an implementation, the foldable module further includes a second connection part, a second pin, a second drive ring, and a second spring. A second pin hole is disposed on the second connection part, the second pin passes through the second drive ring, the second pin hole, and the second spring, a second convex part and a second concave part are disposed between the second drive ring and the second connection part, the second convex part is located between the second spring and the second concave part, or the second concave part is located between the second spring and the second convex part, and the second convex part is embedded in the second concave part.

In an implementation, the first pin and the second pin are disposed in parallel and spaced apart, a first toothed structure is disposed on the first connection part, a second toothed structure is disposed on the second connection part, and the first toothed structure meshes with the second toothed structure; and when the second connection part rotates, the second convex part slides out of the second concave part.

In this disposing manner, the second connection part may be driven to rotate when the first connection part rotates, and an angle of rotation of the first connection part and an angle of rotation of the second connection part are the same. Compared with a case in which only the first connection part rotates, when the second connection part and the first connection part rotate simultaneously, time required for rotating to a folded state or an unfolded state can be shortened, and fast folding and unfolding can be implemented. In addition, the first drive ring and the first connection part may rotate relative to the first pin. Therefore, during mounting, the first pin only needs to pass through the first drive ring and the first pin hole, and positions of the first drive ring and the first connection part relative to the first pin do not need to be controlled. This facilitates mounting. Similarly, the second drive ring and the second connection part may rotate relative to the second pin. Therefore, during mounting, the second pin only needs to pass through the second drive ring and the second pin hole, and positions of the second drive ring and the second connection part relative to the second pin do not need to be controlled. This facilitates mounting.

In an implementation, the first drive ring and the second drive ring are in an integrated structure.

In this disposing manner, the first drive ring and the second drive ring that are in the integrated structure are formed through casting or injection molding, so that a structure is simple and processing is convenient. In addition, the first drive ring and the second drive ring that are in the integrated structure further implement a connection between the first pin and the second pin. In this case, a first supporting piece and a second supporting piece may be connected only by using the foldable module.

In an implementation, the first drive ring is disposed between the first connection part and the first spring, and the second drive ring is disposed between the second connection part and the second spring.

In this disposing manner, the first spring abuts against the first drive ring, so that the first drive ring is attached to the first connection part; and because the first drive ring remains relatively still, compared with contact between the first spring and the first connection part, the first spring can be prevented from hindering rotation of the first connection part, so that user experience is improved. Similarly, the second spring abuts against the second drive ring, so that the second drive ring is attached to the second connection part; and because the second drive ring remains relatively still, compared with contact between the second spring and the second connection part, the second spring can be prevented from hindering rotation of the second connection part, so that user experience is improved.

In an implementation, the foldable module further includes a first circlip and a second circlip, a first snap groove is disposed at a tail end of the first pin, the first circlip is snapped in the first snap groove, and the first spring abuts against the first circlip; and a second snap groove is disposed on the second pin, the second circlip is snapped in the second snap groove, and the second spring abuts against the second circlip.

In this disposing manner, the first circlip snapped in the first snap groove is used to prevent the first spring, the first drive ring, and the first connection part from falling off from the tail end of the first pin, to facilitate assembly/disassembly of the first spring, the first drive ring, and the first connection part. Similarly, the second circlip snapped in the second snap groove is used to prevent the second spring, the second drive ring, and the second connection part from falling off from a tail end of the second pin, to facilitate assembly/disassembly of the second spring, the second drive ring, and the second connection part.

In an implementation, the first circlip and the second circlip are in an integrated structure.

In this disposing manner, the first circlip and the second circlip form an integrated structure through injection molding, casting, or the like, and the first circlip and the second circlip may be mounted simultaneously. In this way, an assembly rate is improved, and in addition, a quantity of parts of the foldable module is reduced, and a structure of the foldable module is simplified. In addition, the first circlip and the second circlip that are in the integrated structure further improve connection force between the first pin and the second pin.

In an implementation, a first stopper is disposed at a head end of the first pin, and a second stopper is disposed at a head end of the second pin.

In this disposing manner, the first stopper cooperates with the first circlip, to sandwich the first spring, the first drive ring, and the first connection part between the first circlip and the first stopper, so that the first spring, the first drive ring, and the first connection part are connected to the first pin. Similarly, the second stopper cooperates with the second circlip, to sandwich the second spring, the second drive ring, and the second connection part between the second circlip and the second stopper, so that the second spring, the second drive ring, and the second connection part are connected to the second pin. In this way, a structure is simple, and assembly/disassembly is facilitated.

In an implementation, the first stopper includes a first stopping flange located at the head end of the first pin and a first pin sleeve that is sleeved on the first pin.

In an implementation, the second stopper includes a second stopping flange located at the head end of the second pin and a second pin sleeve that is sleeved on the second pin.

In an implementation, the first pin sleeve and the second pin sleeve are in an integrated structure.

In this disposing manner, the connection force between the first pin and the second pin can be further improved. In addition, when the first pin sleeve and the second pin sleeve are worn, and elastic force of the first spring and elastic force of the second spring are insufficient, only the first pin sleeve and the second pin sleeve need to be replaced, and the first pin and the second pin do not need to be replaced. Therefore, maintenance costs are reduced.

In an implementation, there are a plurality of first convex parts and a plurality of first concave parts between the first drive ring and the first connection part, and the plurality of the first convex parts are disposed at intervals around an axis of the first pin; and each of the first convex parts cooperates with one of the first concave parts.

In this disposing manner, all the first convex parts may simultaneously slide out of the corresponding first concave parts, or all the first convex parts are simultaneously embedded in the first concave parts, and when any one of the first convex parts is damaged, normal operation of the foldable module is not affected. In the case of full folding and full unfolding, all the first convex parts may be in the first concave parts, to keep a folded state and an unfolded state. In addition, the plurality of first convex parts and the plurality of first concave parts are disposed, so that friction force is increased, and damping force for folding or unfolding can be increased.

According to a second aspect, this application further discloses a foldable electronic device, including: a first supporting piece, a second supporting piece, a foldable screen, and the foldable module described above, where the first supporting piece and the second supporting piece are connected by using the foldable module, and the foldable screen covers the first supporting piece and the second supporting piece.

Based on the foregoing technical solution, according to the foldable module and the foldable electronic device provided in this application, the first pin hole is disposed on the first connection part, the first pin passes through the first drive ring, the first pin hole, and the first spring, the first convex part and the first concave part are disposed between the first drive ring and the first connection part, and the first spring abuts against the first drive ring or the first connection part, so that the first convex part is embedded in the first concave part. In a folding or unfolding process, the first convex part slides out of the first concave part, to provide damping force for unfolding or folding. Compared with a manner in which a first drive surface on a rotating shaft cooperates with a second drive surface on the first drive ring to drive the first drive ring to rotate, the first connection part may directly drive the first convex part and the first concave part to move relative to each other, so that transmission accuracy is improved.

LIST OF REFERENCE NUMERALS

Figure 1:
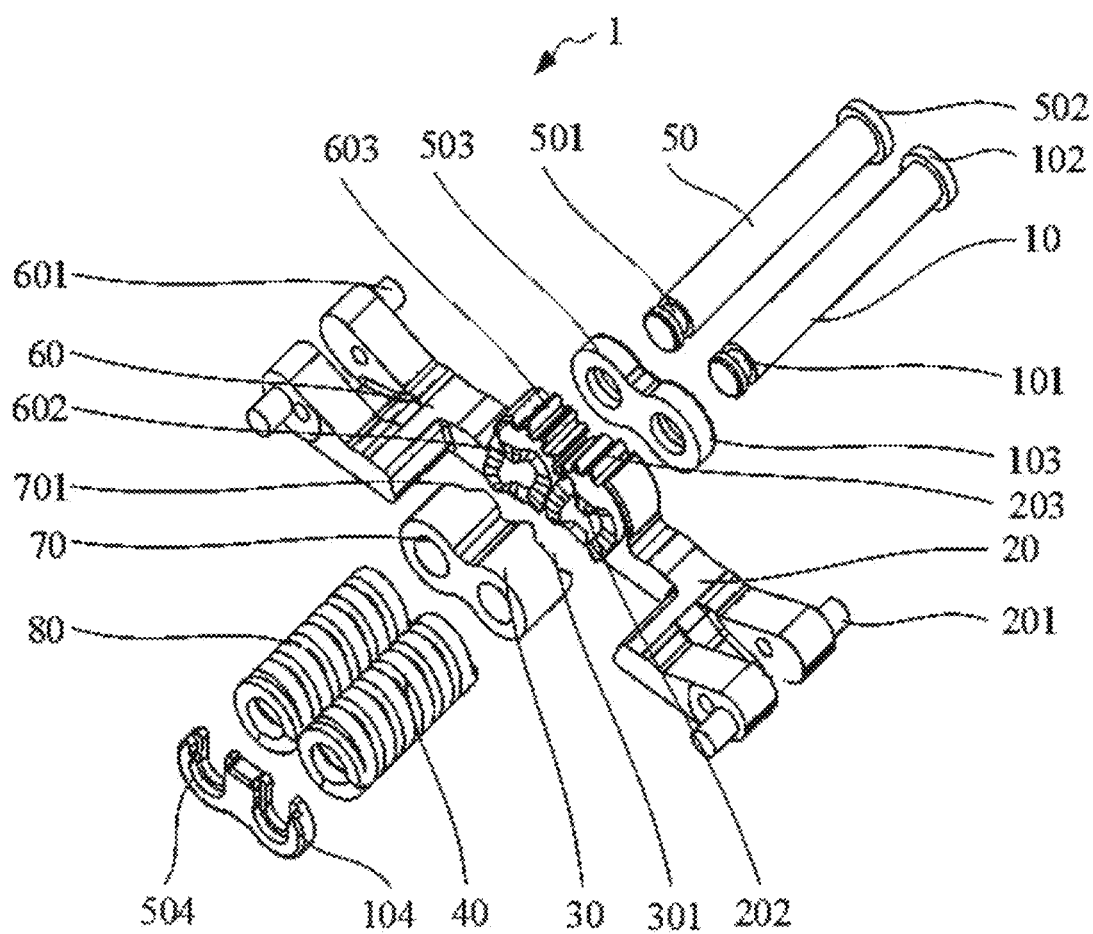
FIG. 1 is an exploded diagram of a foldable module according to an embodiment of this application.

1: Foldable module
2: First supporting piece
3: Second supporting piece
10: First pin
20: First connection part
30: First drive ring
40: First spring
50: Second pin
60: Second connection part
70: Second drive ring
80: Second spring
101: First snap groove
102: First stopper
103: First pin sleeve
104: First circlip
201: First sliding pole
202: First convex part
203: First toothed structure
301: First concave part
501: Second snap groove
502: Second stopper
503: Second pin sleeve
504: Second circlip
601: Second sliding pole
602: Second convex part
603: Second toothed structure
701: Second concave part

DESCRIPTION OF EMBODIMENTS

To make the objectives, technical solutions, and advantages of the embodiments of this application clearer, the following clearly and completely describes the technical solutions in the embodiments of this application with reference to accompanying drawings in the embodiments of this application. It is clearly that, the described embodiments are merely some rather than all of the embodiments of this application. All other embodiments obtained by a person of ordinary skill in the art based on the embodiments of this application without creative efforts shall fall within the protection scope of this application.

Embodiment 1

Figure 2:
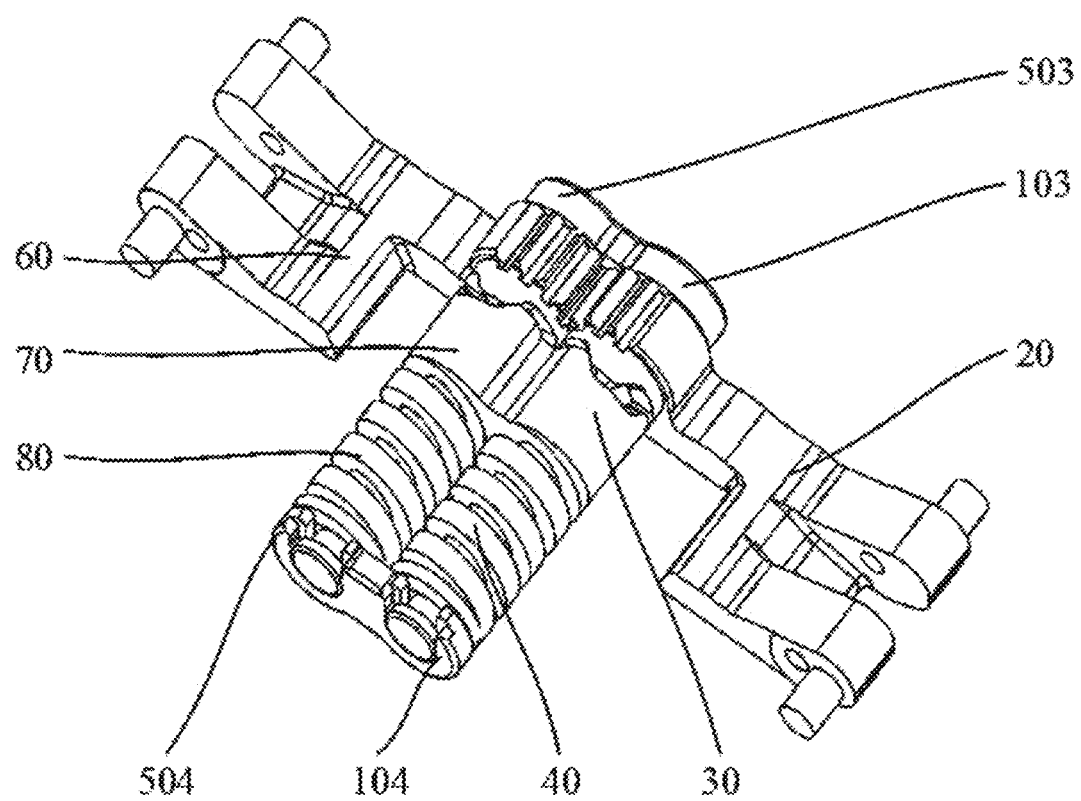
FIG. 2 is a schematic structural diagram when a foldable module is unfolded according to an embodiment of this application.
Figure 3:
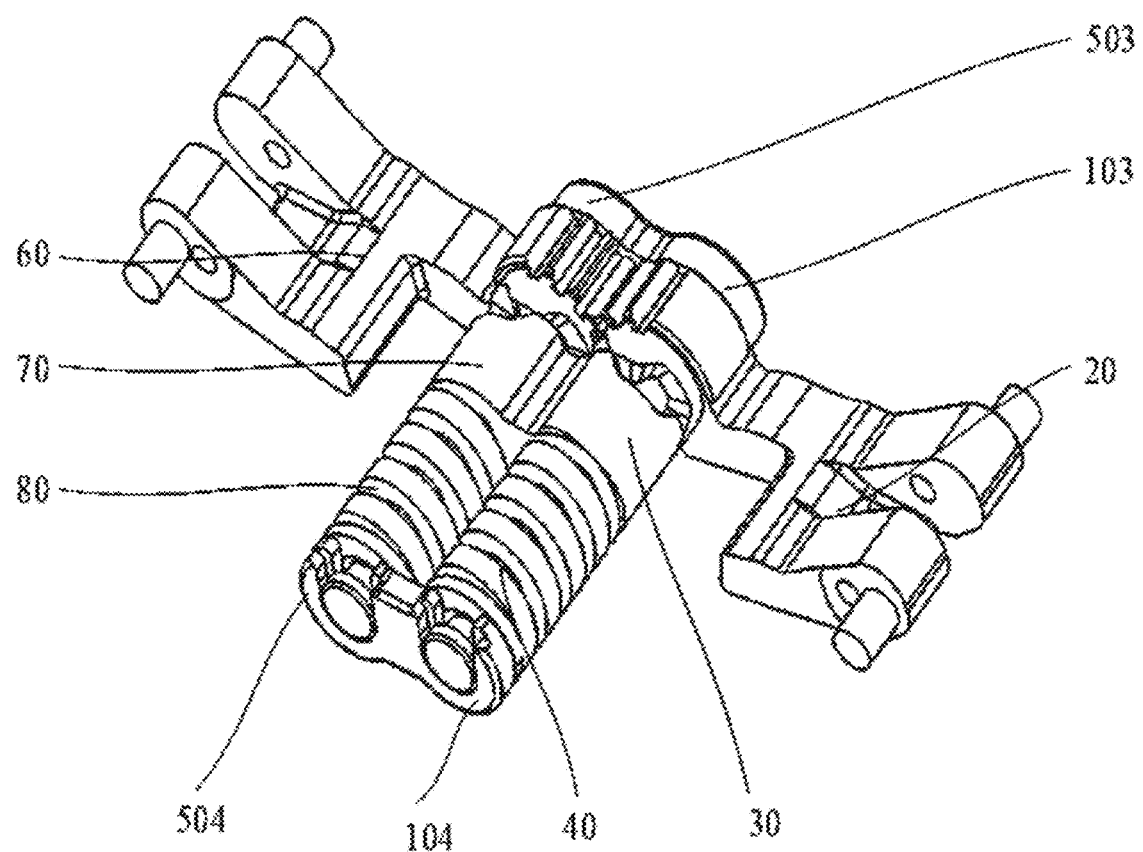
FIG. 3 is a schematic structural diagram when a foldable module is unfolded to 150° according to an embodiment of this application.
Figure 4:
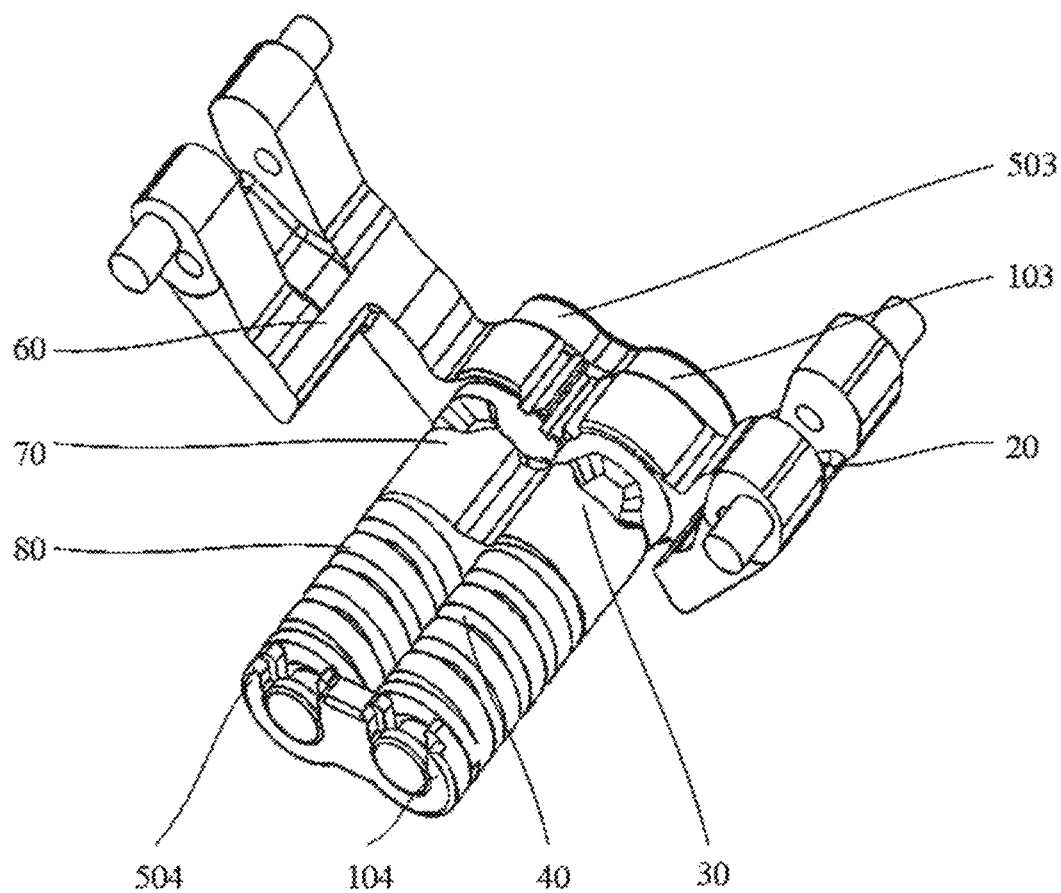
FIG. 4 is a schematic structural diagram when a foldable module is unfolded to 90° according to an embodiment of this application.
Figure 5:
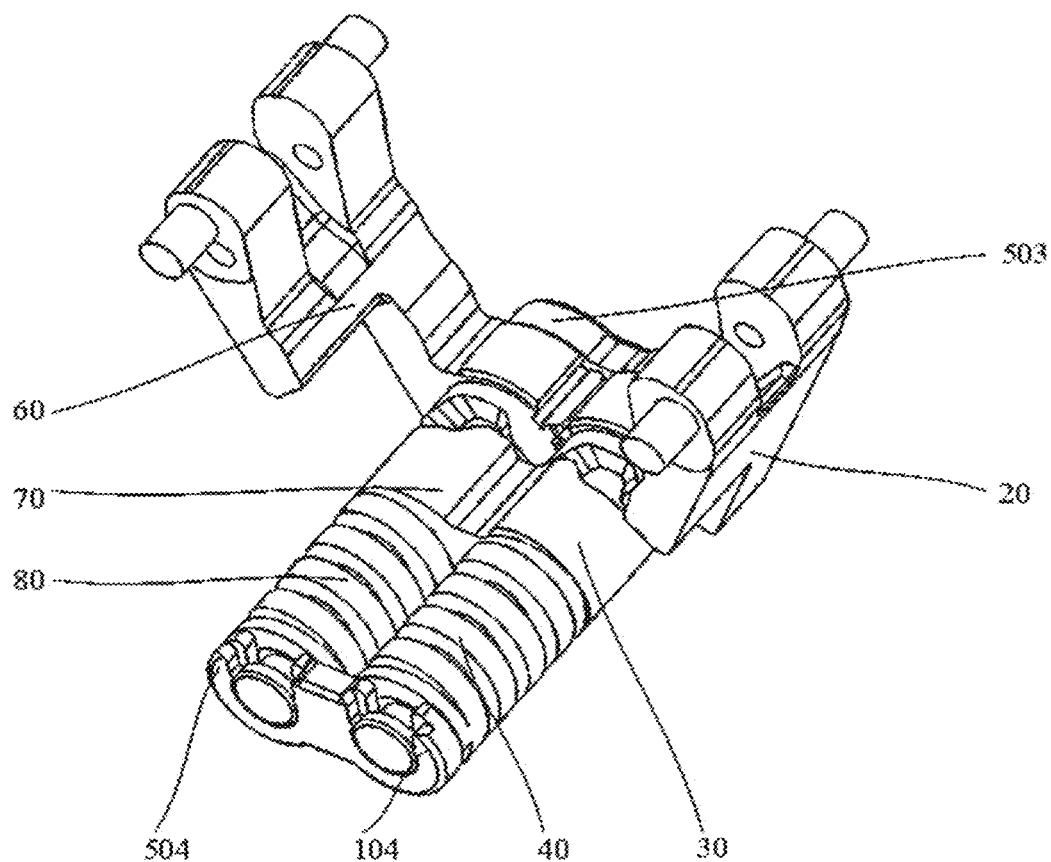
FIG. 5 is a schematic structural diagram when a foldable module is unfolded to 30° according to an embodiment of this application.
Figure 6:
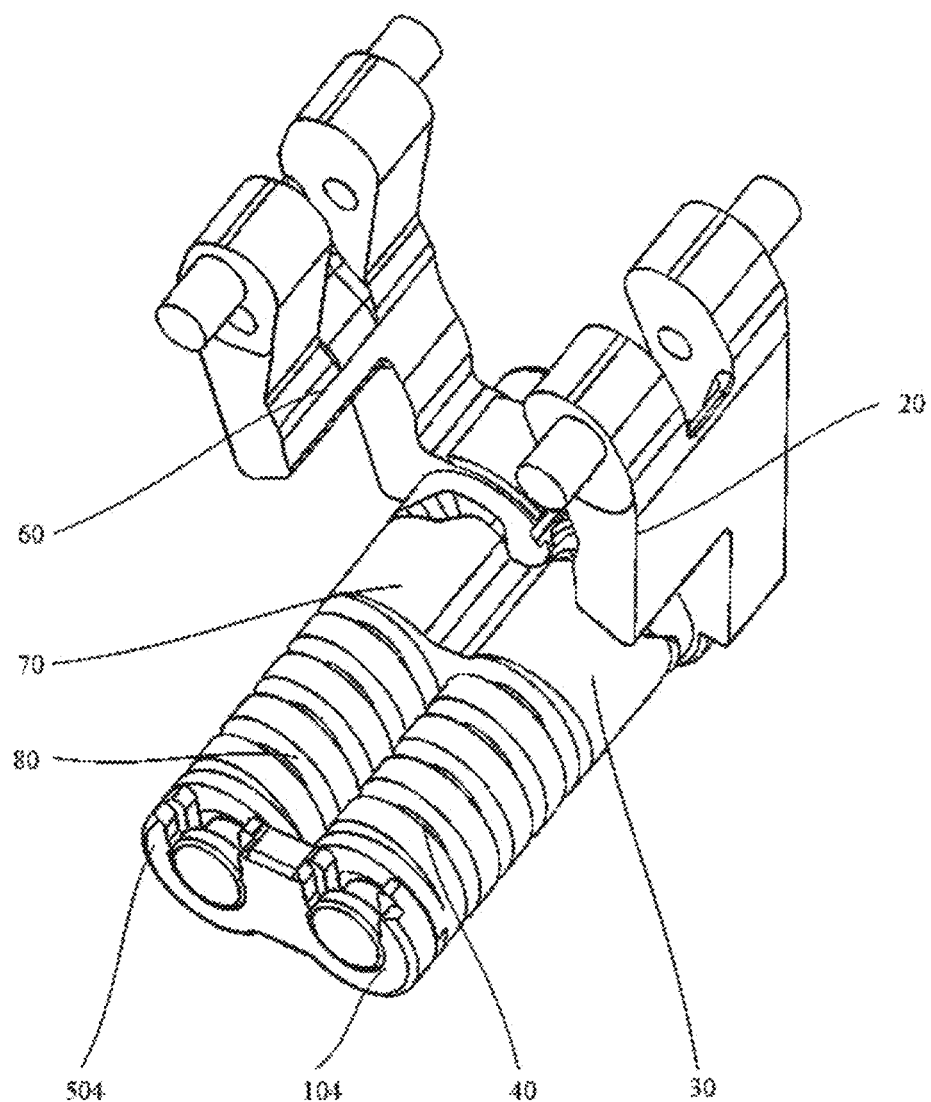
FIG. 6 is a schematic structural diagram when a foldable module is folded according to an embodiment of this application.
Figure 7:
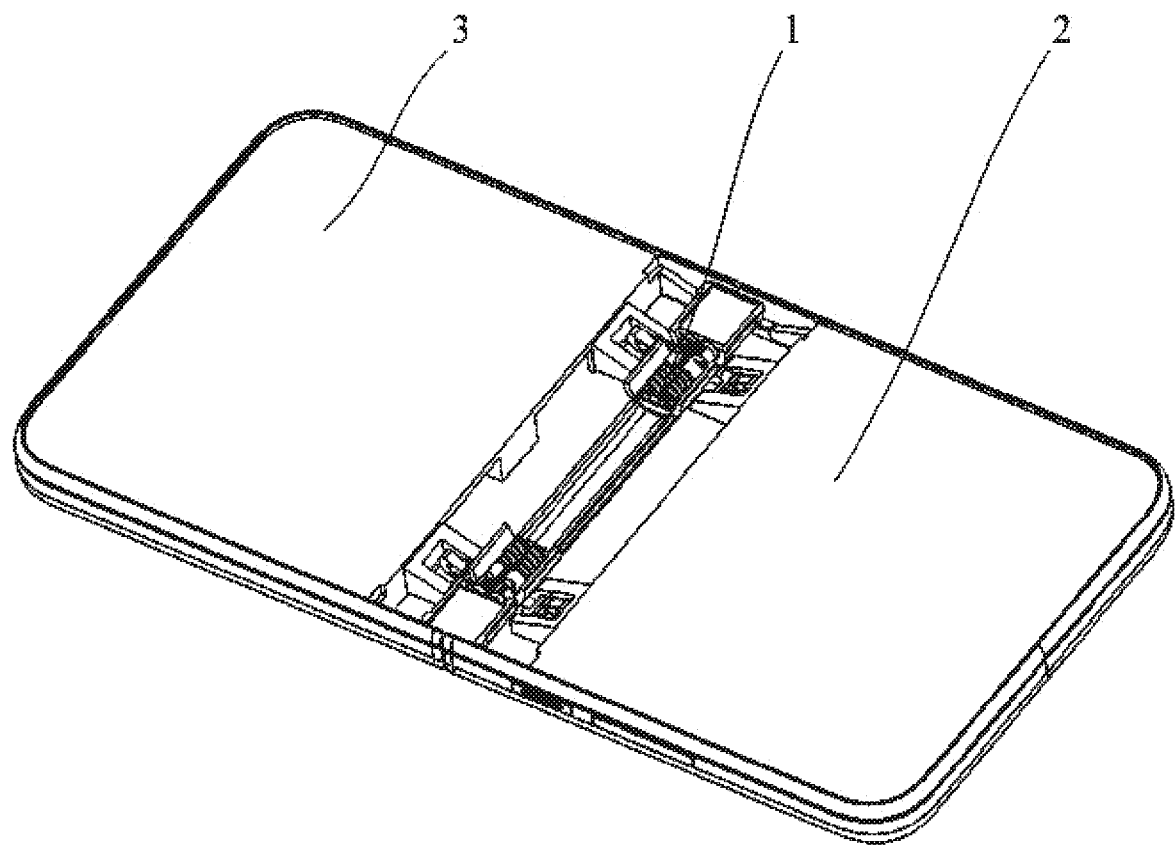
FIG. 7 is a schematic structural diagram of a foldable electronic device according to an embodiment of this application.

FIG. 1 is an exploded diagram of a foldable module according to an embodiment of this application. FIG. 2 is a schematic structural diagram when a foldable module is unfolded according to an embodiment of this application. FIG. 3 is a schematic structural diagram when a foldable module is unfolded to 150° according to an embodiment of this application. FIG. 4 is a schematic structural diagram when a foldable module is unfolded to 90° according to an embodiment of this application. FIG. 5 is a schematic structural diagram when a foldable module is unfolded to 30° according to an embodiment of this application. FIG. 6 is a schematic structural diagram when a foldable module is folded according to an embodiment of this application. FIG. 7 is a schematic structural diagram of a foldable electronic device according to an embodiment of this application.

Refer to FIG. 1 to FIG. 7. This embodiment provides a foldable module 1, including a first connection part 20, a first pin 10, a first drive ring 30, and a first spring 40. A first pin hole is disposed on the first connection part 20, the first pin 10 passes through the first drive ring 30, the first pin hole, and the first spring 40, a first convex part 202 and a first concave part 301 are disposed between the first drive ring 30 and the first connection part 20, the first convex part 202 is located between the first spring 40 and the first concave part 301, or the first concave part 301 is located between the first spring 40 and the first convex part 202, and the first convex part 202 is embedded in the first concave part 301. When the first connection part 20 rotates, the first convex part 202 slides out of the first concave part 301.

Still refer to FIG. 7. Specifically, there are a first supporting piece 2 and a second supporting piece 3 that can be folded to each other on a foldable device; in other words, the first supporting piece 2 and the second supporting piece 3 may be folded together or unfolded. The first connection part 20 is connected to the first supporting piece 2, and correspondingly, the second supporting piece 3 may be connected to the first pin 10. When the first supporting piece 2 and the second supporting piece 3 are folded to each other or unfolded, the first supporting piece 2 drives the first connection part 20 to rotate, so that the first supporting piece 2 rotates relative to the second supporting piece 3.

In this embodiment, preferably, the first connection part 20 and the first supporting piece 2 may be connected in a plurality of manners, provided that it can be ensured that the first supporting piece 2 and the second supporting piece 3 can smoothly rotate. For example, a first sliding pole 201 is disposed on the first connection part 20, and correspondingly, a first sliding slot that cooperates with the first sliding pole 201 is disposed on the first supporting piece 2. When the first supporting piece 2 and the second supporting piece 3 rotate relative to each other, the first connection part 20 rotates around the first pin 10, and the first sliding pole 201 slides inside the first sliding slot. In this disposing manner, when the first connection part 20 rotates with the first supporting piece 2, a margin is reserved for sliding of the first connection part 20 relative to the first supporting piece 2, so that smooth rotation is implemented.

Further, two first sliding poles 201 are disposed on the first connection part 20, and center lines of the two first sliding poles 201 are collinear. In addition, the two first sliding poles 201 are disposed at intervals on two sides of the first connection part 20. Correspondingly, two first sliding slots are disposed on the first supporting piece 2. Each first sliding pole 201 slides into one first sliding slot, and the first connection part 20 is sandwiched between the two first sliding slots, so that the first sliding pole 201 can be prevented from being separated from a corresponding first sliding slot, and connection stability between the first connection part 20 and the first supporting piece 2 is improved.

In this embodiment, the first spring 40 may be a helical spring, and the first pin 10 passes through the first drive ring 30, the first pin hole, and the first spring 40. The first spring 40 may enable the first drive ring 30 and the first connection part 20 to be attached to each other. In this way, the first convex part 202 between the first drive ring 30 and the first connection part 20 is embedded in the first concave part 301.

It should be noted that, to prevent the first pin 10 from falling off from the first drive ring 30, the first spring 40, and the first connection part 20 during use, external threads may be disposed on side walls of the first pin 10 that are close to two ends. Correspondingly, abut nuts that cooperate with the external threads are disposed at positions of the first pin 10 that are close to the two ends, and the two abut nuts are sandwiched on an outer side of the first spring 40, the first drive ring 30, and the first connection part 20, so that the first pin 10 is connected to the first spring 40, the first drive ring 30, and the first connection part 20.

In this embodiment, the first convex part 202 and the first concave part 301 are disposed between the first drive ring 30 and the first connection part 20. For example, the first convex part 202 may be disposed on a side wall that is of the first drive ring 30 and that faces the first connection part 20, and correspondingly, the first concave part 301 is disposed on a side wall that is of the first connection part 20 and that faces the first drive ring 30. Alternatively, the first convex part 202 is disposed on a side wall that is of the first connection part 20 and that faces the first drive ring 30, and the first concave part 301 is disposed on a side wall that is of the first drive ring 30 and that faces the first connection part 20.

In this embodiment, the first spring 40 is configured to attach the first drive ring 30 to the first connection part 20, so that the first convex part 202 is embedded in the first concave part 301. Specifically, the first spring 40 may be directly connected to the first connection part 20; in other words, the first connection part 20 is disposed between the first drive ring 30 and the first spring 40. In this way, the first connection part 20 is attached to the first drive ring 30 under abutting of the first spring 40.

In this embodiment, preferably, shapes and positions of the first convex part 202 and the first concave part 301 are properly set. When the first supporting piece 2 is fully unfolded relative to the second supporting piece 3, the first convex part 202 may be embedded in the first concave part 301, and when the first supporting piece 2 is fully folded relative to the second supporting piece 3, the first convex part 202 may slide out of the first concave part 301. In this way, the first supporting piece 2 can be kept in an unfolded state, damping force is provided in a folding process, and restoring force is provided in an unfolding process of the first supporting piece 2 and the second supporting piece 3, to drive the first supporting piece 2 and the second supporting piece 3 to be automatically unfolded. Certainly, if the shapes and positions of the first convex part 202 and the first concave part 301 are properly set, when the first supporting piece 2 is fully folded relative to the second supporting piece 3, the first convex part 202 may be embedded in the first concave part 301, and when the first supporting piece 2 is fully unfolded relative to the second supporting piece 3, the first convex part 202 may slide out of the first concave part 301. In this way, the first supporting piece 2 and the second supporting piece 3 can be kept in a folded state, damping force is provided in an unfolding process, and restoring force is provided in a folding process of the first supporting piece 2 and the second supporting piece 3, to drive the first supporting piece 2 and the second supporting piece 3 to be automatically folded.

Preferably, a plurality of concave parts 301 may be disposed, and the plurality of concave parts 301 are disposed at intervals around the first pin 10. In addition, when the first supporting piece 2 is fully unfolded relative to the second supporting piece 3, the first convex part 202 is embedded in one first concave part 301, and when the first supporting piece 2 is fully folded relative to the second supporting piece 3, the first convex part 202 is embedded in another first concave part 301. In this way, the first supporting piece 2 and the second supporting piece 3 may be kept in an unfolded state and a folded state. In addition, damping force is provided in both an initial unfolding process and an initial folding process, and restoring force is provided when the first supporting piece 2 and the second supporting piece 3 are to be fully unfolded and to be fully folded, to drive the first supporting piece 2 and the second supporting piece 3 to be fully unfolded or fully folded.

Still refer to FIG. 1 to FIG. 6. For example, when the first connection part 20 and the second connection part 60 are gradually folded from an unfolded state in which an included angle is 180°, the first convex part 202 gradually slides out of the first concave part 301. In this case, the first drive ring 30 is driven to move axially to compress the first spring 40, to provide damping force, so that the first connection part 20 and the second connection part 60 are prevented from being folded. When the included angle between the first connection part 20 and the second connection part 60 is 150° through folding, the entire first convex part 202 slides out of the first concave part 301. In a process in which the included angle between the first connection part 20 and the second connection part 60 is 150° to 30°, the first convex part 202 slides outside the first concave part 301. When the included angle between the first connection part 20 and the second connection part 60 is 30° through folding, the first convex part 202 gradually enters another first concave part 301. In this case, the first drive ring 30 moves axially and the first spring 40 gradually extends to provide restoring force, to drive the first connection part 20 and the second connection part 60 to continue folding until the first connection part 20 and the second connection part 60 are fully folded. On the contrary, when the first connection part 20 and the second connection part 60 are gradually unfolded from a state in which an included angle is 0°, the first convex part 202 gradually slides out of the first concave part 301. In this case, the first drive ring 30 is driven to move axially to compress the first spring 40, to provide damping force, so that the first connection part 20 and the second connection part 60 are prevented from being unfolded. When the included angle between the first connection part 20 and the second connection part 60 is 30° through unfolding, the entire first convex part 202 slides out of the first concave part 301. In a process in which the included angle between the first connection part 20 and the second connection part 60 is 30° to 150°, the first convex part 202 slides outside the first concave part 301. When the included angle between the first connection part 20 and the second connection part 60 is 150° through unfolding, the first convex part 202 gradually enters another first concave part 301. In this case, the first drive ring 30 moves axially and the first spring 40 gradually extends to provide restoring force, to drive the first supporting piece 2 and the second supporting piece 3 to continue unfolding until the first supporting piece 2 and the second supporting piece 3 are fully unfolded.

It should be noted that when the first connection part 20 rotates with the first supporting piece 2, the first drive ring 30 remains relatively still, so that the first connection part 20 rotates relative to the first drive ring 30, and the first convex part 202 is gradually embedded in the first concave part 301, or the first convex part 202 gradually slides out of the first concave part 301. For example, the first drive ring 30 may be connected to the second supporting piece 3, to prevent the first drive ring 30 from rotating with the first connection part 20.

According to the foldable module 1 provided in this embodiment, the first pin hole is disposed on the first connection part 20, the first pin 10 passes through the first drive ring 30, the first pin hole, and the first spring 40, the first convex part 202 and the first concave part 301 are disposed between the first drive ring 30 and the first connection part 20, and the first spring 40 abuts against the first drive ring 30 or the first connection part 20, so that the first convex part 202 is embedded in the first concave part 301. In a folding or unfolding process, the first convex part 202 slides out of the first concave part 301, to provide damping force for unfolding or folding. Compared with a manner in which a first drive surface on a rotating shaft cooperates with a second drive surface on the first drive ring 30 to drive the first drive ring 30 to rotate, the first connection part 20 may directly drive the first convex part 202 and the first concave part 301 to move relative to each other, so that transmission accuracy is improved.

Still refer to FIG. 1. The foldable module 1 provided in this embodiment further includes a second connection part 60, a second pin 50, a second drive ring 70, and a second spring 80. A second pin hole is disposed on the second connection part 60, and the second pin 50 passes through the second drive ring 70, the second pin hole, and the second spring 80. A second convex part 602 and a second concave part 701 are disposed between the second drive ring 70 and the second connection part 60, the second convex part 602 is located between the second spring 80 and the second concave part 701, or the second concave part 701 is located between the second spring 80 and the second convex part 602, and the second convex part 602 is embedded in the second concave part 701. The first pin 10 and the second pin 50 are disposed in parallel and spaced apart. A first toothed structure 203 is disposed on the first connection part 20, a second toothed structure 603 is disposed on the second connection part 60, and the first toothed structure 203 meshes with the second toothed structure 603. When the second connection part 60 rotates, the second convex part 602 slides out of the second concave part 701. In this disposing manner, the second connection part 60 may be driven to rotate when the first connection part 20 rotates, and an angle of rotation of the first connection part 20 and an angle of rotation of the second connection part 60 are the same. Compared with a case in which only the first connection part 20 rotates, when the second connection part 60 and the first connection part 20 rotate simultaneously, time required for rotating to a folded state or an unfolded state can be shortened, and fast folding and unfolding can be implemented. In addition, the first drive ring 30 and the first connection part 10 may rotate relative to the first pin 10. Therefore, during mounting, the first pin 10 only needs to pass through the first drive ring 30 and the first pin hole, and positions of the first drive ring 30 and the first connection part 10 relative to the first pin 10 do not need to be controlled. This facilitates mounting. Similarly, the second drive ring 70 and the second connection part 60 may rotate relative to the second pin 50. Therefore, during mounting, the second pin 50 only needs to pass through the second drive ring 70 and the second pin hole, and positions of the second drive ring 70 and the second connection part 60 relative to the second pin 50 do not need to be controlled. This facilitates mounting.

Specifically, the first connection part 20 is connected to the first supporting piece 2, and the second connection part 60 is connected to the second supporting piece 3. The second connection part 60 and the second supporting piece 3 may be connected in a plurality of manners, provided that it can be ensured that the first supporting piece 2 and the second supporting piece 3 can smoothly rotate. For example, a second sliding pole 601 is disposed on the second connection part 60, and correspondingly, a second sliding slot that cooperates with the second sliding pole 601 is disposed on the second supporting piece 3. When the first supporting piece 2 and the second supporting piece 3 rotate relative to each other, the second connection part 60 rotates around the second pin 50, and the second sliding pole 601 slides inside the second sliding slot. When the second connection part 60 rotates with the second supporting piece 3, a margin is also reserved for sliding of the second connection part 60 relative to the second supporting piece 3, so that smooth rotation is implemented.

Further, two second sliding poles 601 are disposed on the second connection part 60, and center lines of the two second sliding poles 601 are collinear. In addition, the two second sliding poles 601 are disposed at intervals on two sides of the second connection part 60. Correspondingly, two second sliding slots are disposed on the second supporting piece 3. Each second sliding pole 601 slides into one second sliding slot, and the second connection part 60 is sandwiched between the two second sliding slots, so that the second sliding pole 601 can be prevented from being separated from a corresponding second sliding slot, and connection stability between the second connection part 60 and the second supporting piece 3 is improved.

In this embodiment, the second spring 80 is a helical spring, the second pin 50 passes through the second drive ring 70, the second pin hole, and the second spring 80, and the second spring 80 may press the second drive ring 70 onto the second connection part 60. In this way, the second convex part 602 between the second drive ring 70 and the second connection part 60 is embedded in the second concave part 701.

It should be noted that, to prevent the second pin 50 from falling off from the second drive ring 70, the second spring 80, and the second connection part 60 during use, external threads may be disposed on side walls of the second pin 50 that are close to two ends. Correspondingly, abut nuts that cooperate with the external threads are disposed at positions of the second pin 50 that are close to the two ends, and the two abut nuts are sandwiched on an outer side of the second spring 80, the second drive ring 70, and the second connection part 60, so that the second pin 50 is connected to the second spring 80, the second drive ring 70, and the second connection part 60.

In this embodiment, the second convex part 602 and the second concave part 701 are disposed between the second drive ring 70 and the second connection part 60. For example, the second convex part 602 may be disposed on a side wall that is of the second drive ring 70 and that faces the second connection part 60, and correspondingly, the second concave part 701 is disposed on a side wall that is of the second connection part 60 and that faces the second drive ring 70. Alternatively, the second convex part 602 is disposed on a side wall that is of the second connection part 60 and that faces the second drive ring 70, and the second concave part 701 is disposed on a side wall that is of the second drive ring 70 and that faces the second connection part 60.

In this embodiment, the second spring 80 is configured to attach the second drive ring 70 to the second connection part 60, so that the second convex part 602 is embedded in the second concave part 701. Specifically, the second spring 80 may be directly connected to the second connection part 60; in other words, the second connection part 60 is disposed between the second drive ring 70 and the second spring 80. In this way, the second connection part 60 is attached to the second drive ring 70 under abutting of the second spring 80.

In this embodiment, a shape of the second convex part 602 is the same as a shape of the first convex part 202, a shape of the corresponding second concave part 701 is the same as a shape of the first concave part 301, and when the first convex part 202 is embedded in the first concave part 301, the second convex part 602 is also embedded in the second concave part 701, and when the first convex part 202 slides out of the first concave part 301, the second convex part 602 also slides out of the second concave part 701. In this disposing manner, when the first supporting piece 2 and the second supporting piece 3 are folded or unfolded, the first spring 40 and the second spring 80 are simultaneously compressed or simultaneously extended, to increase damping force and restoring force, and improve user experience.

In this embodiment, the first drive ring 30 and the second drive ring 70 may be connected, so that the first drive ring 30 and the second drive ring 70 are prevented from rotating with the first connection part 20 and the second connection part 60. When the first connection part 20 and the second connection part 60 rotate, the first convex part 202 slides out of the first concave part 301 or the first convex part 202 is embedded in the first concave part 301. For example, the first drive ring 30 and the second drive ring 70 may be connected by using a bolt or through snapping, provided that the first drive ring 30 and the second drive ring 70 do not rotate after the first drive ring 30 and the second drive ring 70 are connected.

Still refer to FIG. 1. In this embodiment, preferably, the first drive ring 30 and the second drive ring 70 are in an integrated structure. The first drive ring 30 and the second drive ring 70 that are in the integrated structure are formed through casting or injection molding, so that a structure is simple and processing is convenient. In addition, the first drive ring 30 and the second drive ring 70 that are in the integrated structure further implement a connection between the first pin 10 and the second pin 50. In this case, the first supporting piece 2 and the second supporting piece 3 may be connected only by using the foldable module 1.

Still refer to FIG. 1. In this embodiment, preferably, the first drive ring 30 is disposed between the first connection part 20 and the first spring 40, and the second drive ring 70 is disposed between the second connection part 60 and the second spring 80. The first spring 40 abuts against the first drive ring 30, so that the first drive ring 30 is attached to the first connection part 20; and because the first drive ring 30 remains relatively still, compared with contact between the first spring 40 and the first connection part 20, the first spring 40 can be prevented from hindering rotation of the first connection part 20, so that user experience is improved. Similarly, the second spring 80 abuts against the second drive ring 70, so that the second drive ring 70 is attached to the second connection part 60; and because the second drive ring 70 remains relatively still, compared with contact between the second spring 80 and the second connection part 60, the second spring 80 can be prevented from hindering rotation of the second connection part 60, so that user experience is improved.

Still refer to FIG. 1. In this embodiment, the foldable module 1 further includes a first circlip 104 and a second circlip 504. A first snap groove 101 is disposed at a tail end of the first pin 10, the first circlip 104 is snapped in the first snap groove 101, and the first spring 40 abuts against the first circlip 104. A second snap groove 501 is disposed on the second pin 50, the second circlip 504 is snapped in the second snap groove 501, and the second spring 80 abuts against the second circlip 504. The first circlip 104 snapped in the first snap groove 101 is used to prevent the first spring 40, the first drive ring 30, and the first connection part 20 from falling off from the tail end of the first pin 10, so that assembly/disassembly of the first spring 40, the first drive ring 30, and the first connection part 20 is facilitated compared with a manner of disposing an abut nut. Similarly, the second circlip 504 snapped in the second snap groove 501 is used to prevent the second spring 80, the second drive ring 70, and the second connection part 60 from falling off from a tail end of the second pin 50, so that assembly/disassembly of the second spring 80, the second drive ring 70, and the second connection part 60 is facilitated compared with the manner of disposing an abut nut.

Specifically, in this embodiment, both the first circlip 104 and the second circlip 504 may be made of metal. The first circlip 104 may be plate-shaped. A first notch is disposed on the first circlip 104, and the first notch is inserted into the first snap groove 101. Then, the first circlip 104 is deformed, so that a width of the first notch is reduced, and interference fit between a side wall of the first notch and the first snap groove 101 is implemented, to prevent the first circlip 104 from falling off from the first snap groove 101. Certainly, in this embodiment, the first circlip 104 may alternatively be ring-shaped or the like. Similarly, the second circlip 504 may be plate-shaped, a second notch is disposed on the second circlip 504, and the second notch is inserted into the second snap groove 501. Then, the second circlip 504 is deformed, so that a width of the second notch is reduced, and interference fit between a side wall of the second notch and the second snap groove 501 is implemented, to prevent the second circlip 504 from falling off from the second snap groove 501. Certainly, in this embodiment, the second circlip 504 may alternatively be ring-shaped or the like.

Preferably, in this embodiment, the first circlip 104 and the second circlip 504 are in an integrated structure. The first circlip 104 and the second circlip 504 form the integrated structure through injection molding, casting, or the like, and the first circlip 104 and the second circlip 504 may be mounted simultaneously. In this way, an assembly rate is improved, and in addition, a quantity of parts of the foldable module 1 is reduced, and a structure of the foldable module 1 is simplified. In addition, the first circlip 104 and the second circlip 504 that are in the integrated structure further improve connection force between the first pin 10 and the second pin 50.

In this embodiment, a first stopper 102 is disposed at a head end of the first pin 10, and a second stopper 502 is disposed at a head end of the second pin 50. The first stopper 102 cooperates with the first circlip 104, to sandwich the first spring 40, the first drive ring 30, and the first connection part 20 between the first circlip 104 and the first stopper 102, so that the first spring 40, the first drive ring 30, and the first connection part 20 are connected to the first pin 10. Similarly, the second stopper 502 cooperates with the second circlip 504, to sandwich the second spring 80, the second drive ring 70, and the second connection part 60 between the second circlip 504 and the second stopper 502, so that the second spring 80, the second drive ring 70, and the second connection part 60 are connected to the second pin 50. In this way, a structure is simple, and assembly/disassembly is facilitated.

Preferably, a distance between the first stopper 102 and the first circlip 104 is properly set, and elastic force after the first spring 40 is assembled may be adjusted, to change abutting force of the first spring 40 against the first drive ring 30, and adjust damping force generated when the first convex part 202 slides out of the first concave part 301, and restoring force generated when the first convex part 202 is embedded in the first concave part 301. Similarly, a distance between the second stopper 502 and the second circlip 504 is properly set, and elastic force after the second spring 80 is assembled may be adjusted, to change abutting force of the second spring 80 against the second drive ring 70, and adjust damping force generated when the second convex part 602 slides out of the second concave part 701, and restoring force generated when the second convex part 602 is embedded in the second concave part 701.

Still refer to FIG. 1. In this embodiment, the first stopper 102 includes a first stopping flange located at the head end of the first pin 10 and a first pin sleeve 103 that is sleeved on the first pin 10; and the second stopper 502 includes a second stopping flange located at the head end of the second pin 50 and a second pin sleeve 503 that is sleeved on the second pin 50. The first pin sleeve 103 and the second pin sleeve 503 are in an integrated structure. In this disposing manner, the connection force between the first pin 10 and the second pin 50 can be further improved. In addition, when the first pin sleeve 103 and the second pin sleeve 503 are worn, and elastic force of the first spring 40 and elastic force of the second spring 80 are insufficient, only the first pin sleeve 103 and the second pin sleeve 503 need to be replaced, and the first pin 10 and the second pin 50 do not need to be replaced. Therefore, maintenance costs are reduced.

Still refer to FIG. 1. In this embodiment, there are a plurality of first convex parts 202 and a plurality of first concave parts 301 between the first drive ring 30 and the first connection part 20, the plurality of first convex parts 202 are disposed at intervals around an axis of the first pin 10, and each first convex part 202 cooperates with one first concave part 301. In this disposing manner, all the first convex parts 202 may simultaneously slide out of the corresponding first concave parts 301, or all the first convex parts 202 are simultaneously embedded in the first concave parts 301, and when any one of the first convex parts 202 is damaged, normal operation of the foldable module 1 is not affected. In the case of full folding and full unfolding, all the first convex parts 202 are in the first concave parts 301, to keep a folded state and an unfolded state. In addition, the plurality of first convex parts 202 and the plurality of first concave parts 301 are disposed, so that friction force is increased, and damping force for folding or unfolding can be increased.

Further, there are a plurality of second convex parts 602 and a plurality of second concave parts 701 between the second drive ring 70 and the second connection part 60, the plurality of second convex parts 602 are disposed at intervals around an axis of the second pin 50, and each second convex part 602 cooperates with one second concave part 701. In addition, when all the first convex parts 202 are embedded in the corresponding first concave parts 301, all the second convex parts 602 are embedded in the corresponding second concave parts 701, and when all the first convex parts 202 slide out of the corresponding first concave parts 301, all the second convex parts 602 slide out of the corresponding second concave parts 701. In this disposing manner, all the second convex parts 602 may simultaneously slide out of the corresponding second concave parts 701, or all the second convex parts 602 are simultaneously embedded in the second concave parts 701. When any one of the second convex parts 602 is damaged, normal operation of the foldable module 1 is not affected. In addition, all the second convex parts 602 may be in the second concave parts 701 in the case of full folding and full unfolding, to keep a folded state and an unfolded state. In addition, the plurality of second convex parts 602 and the plurality of second concave parts 701 are disposed, so that friction force is increased, and damping force for folding or unfolding can be increased.

Embodiment 2

Still refer to FIG. 1 to FIG. 7. This embodiment provides a foldable electronic device, including the foldable module 1 described above.

Specifically, the foldable electronic device further includes a first supporting piece 2, a second supporting piece 3, and a foldable screen. The first supporting piece 2 and the second supporting piece 3 are connected by using the foldable module 1, so that the first supporting piece 2 and the second supporting piece 3 may be unfolded to each other or folded together, and the foldable screen covers the first supporting piece 2 and the second supporting piece 3. Preferably, both the first supporting piece 2 and the second supporting piece 3 may be plate-shaped, and correspondingly, electrical elements may be disposed on the first supporting piece 2 and/or the second supporting piece 3, to implement functions of the foldable electronic device.

The foldable module 1 includes a first connection part 20, a first pin 10, a first drive ring 30, and a first spring 40. A first pin hole is disposed on the first connection part 20, the first pin 10 passes through the first drive ring 30, the first pin hole, and the first spring 40, a first convex part 202 and a first concave part 301 are disposed between the first drive ring 30 and the first connection part 20, the first convex part 202 is located between the first spring 40 and the first concave part 301, or the first concave part 301 is located between the first spring 40 and the first convex part 202, and the first convex part 202 is embedded in the first concave part 301. When the first connection part 20 rotates, the first convex part 202 slides out of the first concave part 301.

Still refer to FIG. 7. Specifically, there are a first supporting piece 2 and a second supporting piece 3 that can be folded to each other on a foldable device; in other words, the first supporting piece 2 and the second supporting piece 3 may be folded together or unfolded. The first connection part 20 is connected to the first supporting piece 2, and correspondingly, the second supporting piece 3 may be connected to the first pin 10. When the first supporting piece 2 and the second supporting piece 3 are folded to each other or unfolded, the first supporting piece 2 drives the first connection part 20 to rotate, so that the first supporting piece 2 rotates relative to the second supporting piece 3.

In this embodiment, preferably, the first connection part 20 and the first supporting piece 2 may be connected in a plurality of manners, provided that it can be ensured that the first supporting piece 2 and the second supporting piece 3 can smoothly rotate. For example, a first sliding pole 201 is disposed on the first connection part 20, and correspondingly, a first sliding slot that cooperates with the first sliding pole 201 is disposed on the first supporting piece 2. When the first supporting piece 2 and the second supporting piece 3 rotate relative to each other, the first connection part 20 rotates around the first pin 10, and the first sliding pole 201 slides inside the first sliding slot. In this disposing manner, when the first connection part 20 rotates with the first supporting piece 2, a margin is reserved for sliding of the first connection part 20 relative to the first supporting piece 2, so that smooth rotation is implemented.

Further, two first sliding poles 201 are disposed on the first connection part 20, and center lines of the two first sliding poles 201 are collinear. In addition, the two first sliding poles 201 are disposed at intervals on two sides of the first connection part 20. Correspondingly, two first sliding slots are disposed on the first supporting piece 2. Each first sliding pole 201 slides into one first sliding slot, and the first connection part 20 is sandwiched between the two first sliding slots, so that the first sliding pole 201 can be prevented from being separated from a corresponding first sliding slot, and connection stability between the first connection part 20 and the first supporting piece 2 is improved.

In this embodiment, the first convex part 202 and the first concave part 301 are disposed between the first drive ring 30 and the first connection part 20. For example, the first convex part 202 may be disposed on a side wall that is of the first drive ring 30 and that faces the first connection part 20, and correspondingly, the first concave part 301 is disposed on a side wall that is of the first connection part 20 and that faces the first drive ring 30. Alternatively, the first convex part 202 is disposed on a side wall that is of the first connection part 20 and that faces the first drive ring 30, and the first concave part 301 is disposed on a side wall that is of the first drive ring 30 and that faces the first connection part 20.

In this embodiment, preferably, shapes and positions of the first convex part 202 and the first concave part 301 are properly set. When the first supporting piece 2 is fully unfolded relative to the second supporting piece 3, the first convex part 202 may be embedded in the first concave part 301, and when the first supporting piece 2 is fully folded relative to the second supporting piece 3, the first convex part 202 may slide out of the first concave part 301. In this way, the first supporting piece 2 can be kept in an unfolded state, damping force is provided in a folding process, and restoring force is provided in an unfolding process of the first supporting piece 2 and the second supporting piece 3, to drive the first supporting piece 2 and the second supporting piece 3 to be automatically unfolded. Certainly, if the shapes and positions of the first convex part 202 and the first concave part 301 are properly set, when the first supporting piece 2 is fully folded relative to the second supporting piece 3, the first convex part 202 may be embedded in the first concave part 301, and when the first supporting piece 2 is fully unfolded relative to the second supporting piece 3, the first convex part 202 may slide out of the first concave part 301. In this way, the first supporting piece 2 and the second supporting piece 3 can be kept in a folded state, damping force is provided in an unfolding process, and restoring force is provided in a folding process of the first supporting piece 2 and the second supporting piece 3, to drive the first supporting piece 2 and the second supporting piece 3 to be automatically folded.

Preferably, a plurality of concave parts 301 may be disposed, and the plurality of concave parts 301 are disposed at intervals around the first pin 10. In addition, when the first supporting piece 2 is fully unfolded relative to the second supporting piece 3, the first convex part 202 is embedded in one first concave part 301, and when the first supporting piece 2 is fully folded relative to the second supporting piece 3, the first convex part 202 is embedded in another first concave part 301. In this way, the first supporting piece 2 and the second supporting piece 3 may be kept in an unfolded state and a folded state. In addition, damping force is provided in both an initial unfolding process and an initial folding process, and restoring force is provided when the first supporting piece 2 and the second supporting piece 3 are to be fully unfolded and to be fully folded, to drive the first supporting piece 2 and the second supporting piece 3 to be fully unfolded or fully folded.

Still refer to FIG. 1 to FIG. 6. For example, when the first connection part 20 and the second connection part 60 are gradually folded from an unfolded state in which an included angle is 180°, the first convex part 202 gradually slides out of the first concave part 301. In this case, the first drive ring 30 is driven to move axially to compress the first spring 40, to provide damping force, so that the first connection part 20 and the second connection part 60 are prevented from being folded. When the included angle between the first connection part 20 and the second connection part 60 is 150° through folding, the entire first convex part 202 slides out of the first concave part 301. When the included angle between the first connection part 20 and the second connection part 60 is 30° through folding, the first convex part 202 gradually enters another first concave part 301. In this case, the first drive ring 30 moves axially and the first spring 40 gradually extends to provide restoring force, to drive the first connection part 20 and the second connection part 60 to continue folding until the first connection part 20 and the second connection part 60 are fully folded. On the contrary, when the first connection part 20 and the second connection part 60 are gradually unfolded from a state in which an included angle is 0°, the first convex part 202 gradually slides out of the first concave part 301. In this case, the first drive ring 30 is driven to move axially to compress the first spring 40, to provide damping force, so that the first connection part 20 and the second connection part 60 are prevented from being unfolded. When the included angle between the first connection part 20 and the second connection part 60 is 30° through unfolding, the entire first convex part 202 slides out of the first concave part 301. When the included angle between the first connection part 20 and the second connection part 60 is 150° through unfolding, the first convex part 202 gradually enters another first concave part 301. In this case, the first drive ring 30 moves axially and the first spring 40 gradually extends to provide restoring force, to drive the first concave part 301 to continue unfolding until the first concave part 301 is fully unfolded.

It should be noted that when the first connection part 20 rotates with the first supporting piece 2, the first drive ring 30 remains relatively still, so that the first connection part 20 rotates relative to the first drive ring 30, and the first convex part 202 is gradually embedded in the first concave part 301, or the first convex part 202 gradually slides out of the first concave part 301. For example, the first drive ring 30 may be connected to the second supporting piece 3, to prevent the first drive ring 30 from rotating with the first connection part 20.

According to the foldable electronic device provided in this embodiment, the first pin hole is disposed on the first connection part 20, the first pin 10 passes through the first drive ring 30, the first pin hole, and the first spring 40, the first convex part 202 and the first concave part 301 are disposed between the first drive ring 30 and the first connection part 20, and the first spring 40 abuts against the first drive ring 30 or the first connection part 20, so that the first convex part 202 is embedded in the first concave part 301. In a folding or unfolding process, the first convex part 202 slides out of the first concave part 301, to provide damping force for unfolding or folding. Compared with a manner in which a first drive surface on a rotating shaft cooperates with a second drive surface on the first drive ring 30 to drive the first drive ring 30 to rotate, the first connection part 20 may directly drive the first convex part 202 and the first concave part 301 to move relative to each other, so that transmission accuracy is improved.

In the descriptions of this application, it should be understood that, directions or position relationships indicated by terms "center", "longitudinal", "transverse", "length", "width", "thickness", "up", "down", "in front of", "behind", "left", "right", "vertical", "horizontal", "top", "bottom", "inside", "outside", "clockwise", "counterclockwise", "axial", "radial", "circumferential", and the like are based on directions or position relationships shown in the accompanying drawings, and are merely intended for ease of describing this application and simplifying descriptions, instead of indicating or implying that an indicated apparatus or component needs to have a particular direction or be constructed and operated in a particular direction, and therefore should not be understood as limitations on this application.

It should be noted that, in the descriptions of this application, terms "first" and "second" are merely used to facilitate description of different components, and should not be understood as an indication or implication of a sequence relationship or relative importance, or an implicit indication of a quantity of indicated technical features. Therefore, a feature limited by "first" or "second" may explicitly or implicitly include at least one such feature.

In this application, unless otherwise specified, terms such as "mount", "link", "connect", and "fasten" should be understood in a broad sense, for example, may be a fixed connection, may be a detachable connection, may be integrated molding, may be a mechanical connection, may be an electrical connection, may be mutual communication, may be a direct connection, may be an indirect connection by using an intermediate medium, may be an internal connection between two elements, or an interaction relationship between two elements, unless otherwise specifically limited. A person of ordinary skill in the art may interpret specific meanings of the foregoing terms in this application according to specific cases.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A foldable module, comprising a first connection part, a first pin, a first drive ring, and a first spring, wherein
the first connection part comprises a first rotating end, a first pin hole is disposed on the first rotating end, the first pin passes through the first drive ring, the first pin hole, and the first spring, the first rotating end is rotatably connected to the first pin, a first convex part is disposed on one side of the first rotating end toward the first drive ring, a first concave part is disposed on the first drive ring, the first concave part is located between the first spring and the first convex part, and the first convex part is embedded in the first concave part; and
in response to a rotation of the first connection part, the first convex part slides out of the first concave part;
wherein the foldable module further comprises a second connection part, a second pin, a second drive ring, and a second spring; and
the second connection part comprises a second rotating end, a second pin hole is disposed on the second rotating end, the second pin passes through the second drive ring, the second pin hole, and the second spring, the second rotating end is rotatably connected to the second pin, a second convex part is disposed on one side of the second rotating end toward the second drive ring, a second concave part is disposed on the second drive ring, the second concave part is located between the second spring and the second convex part, and the second convex part is embedded in the second concave part;
in response to a rotation of the second connection part, the second convex part slides out of the second concave part;
wherein the first pin and the second pin are disposed in parallel and spaced apart, a first toothed structure is disposed on one side of the first connection part towards the second connection part, a second toothed structure is disposed on one side of the second connection part towards the first connection part, and the first toothed structure and the second toothed structure are used to drive the second connection part to rotate synchronously in response to the rotation of the first connection part.

2. The foldable module according to claim 1, wherein the first toothed structure meshes with the second toothed structure.

3. The foldable module according to claim 2, wherein the first drive ring and the second drive ring are in an integrated structure.

4. The foldable module according to claim 2, wherein the first drive ring is disposed between the first connection part and the first spring, and the second drive ring is disposed between the second connection part and the second spring.

5. The foldable module according to claim 2, further comprising a first circlip and a second circlip, a first snap groove is disposed at a tail end of the first pin, the first circlip is snapped in the first snap groove, and the first spring abuts against the first circlip; and
a second snap groove is disposed on the second pin, the second circlip is snapped in the second snap groove, and the second spring abuts against the second circlip.

6. The foldable module according to claim 5, wherein the first circlip and the second circlip are in an integrated structure.

7. The foldable module according to claim 5, wherein a first stopper is disposed at a head end of the first pin, and a second stopper is disposed at a head end of the second pin.

8. The foldable module according to claim 7, wherein the first stopper comprises a first stopping flange located at the head end of the first pin and a first pin sleeve that is sleeved on the first pin, and the second stopper comprises a second stopping flange located at the head end of the second pin and a second pin sleeve that is sleeved on the second pin.

9. The foldable module according to claim 8, wherein the first pin sleeve and the second pin sleeve are in an integrated structure.

10. The foldable module according to claim 1, wherein there are a plurality of first convex parts and a plurality of first concave parts, and the plurality of the first convex parts are disposed at intervals around an axis of the first pin; and each of the first convex parts cooperates with one of the first concave parts.

11. A foldable electronic device, comprising: a first supporting piece, a second supporting piece, a foldable screen, and a foldable module, wherein the first supporting piece and the second supporting piece are connected by using the foldable module, and the foldable screen covers the first supporting piece and the second supporting piece, wherein the foldable module comprises a first connection part, a first pin, a first drive ring, and a first spring, wherein
the first connection part comprises a first rotating end, a first pin hole is disposed on the first rotating end, the first pin passes through the first drive ring, the first pin hole, and the first spring, the first rotating end is rotatably connected to the first pin, a first convex part is disposed on one side of the first rotating end toward the first drive ring, a first concave part is disposed on the first drive ring, the first concave part is located between the first spring and the first convex part, and the first convex part is embedded in the first concave part; and
in response to a rotation of the first connection part, the first convex part slides out of the first concave part;
wherein the foldable module further comprises a second connection part, a second pin, a second drive ring, and a second spring; and
the second connection part comprises a second rotating end, a second pin hole is disposed on the second rotating end, the second pin passes through the second drive ring, the second pin hole, and the second spring, the second rotating end is rotatably connected to the second pin, a second convex part is disposed on one side of the second rotating end toward the second drive ring, a second concave part is disposed on the second drive ring, the second concave part is located between the second spring and the second convex part, and the second convex part is embedded in the second concave part;
in response to a rotation of the second connection part, the second convex part slides out of the second concave part;
wherein the first pin and the second pin are disposed in parallel and spaced apart, a first toothed structure is disposed on one side of the first connection part towards the second connection part, a second toothed structure is disposed on one side of the second connection part towards the first connection part, and the first toothed structure and the second toothed structure are used to drive the second connection part to rotate synchronously in response to the rotation of the first connection part.

12. The foldable electronic device according to claim 11, wherein the first toothed structure meshes with the second toothed structure.

13. The foldable electronic device according to claim 12, wherein the first drive ring and the second drive ring are in an integrated structure.

14. The foldable electronic device according to claim 12, wherein the first drive ring is disposed between the first connection part and the first spring, and the second drive ring is disposed between the second connection part and the second spring.

15. The foldable electronic device according to claim 12, further comprising a first circlip and a second circlip, a first snap groove is disposed at a tail end of the first pin, the first circlip is snapped in the first snap groove, and the first spring abuts against the first circlip; and
a second snap groove is disposed on the second pin, the second circlip is snapped in the second snap groove, and the second spring abuts against the second circlip.

16. The foldable electronic device according to claim 15, wherein the first circlip and the second circlip are in an integrated structure.

17. The foldable electronic device according to claim 15, wherein a first stopper is disposed at a head end of the first pin, and a second stopper is disposed at a head end of the second pin.

18. The foldable electronic device according to claim 17, wherein the first stopper comprises a first stopping flange located at the head end of the first pin and a first pin sleeve that is sleeved on the first pin, and the second stopper comprises a second stopping flange located at the head end of the second pin and a second pin sleeve that is sleeved on the second pin.

19. The foldable electronic device according to claim 18, wherein the first pin sleeve and the second pin sleeve are in an integrated structure.

20. The foldable electronic device according to claim 11, wherein there are a plurality of first convex parts and a plurality of first concave parts, and the plurality of the first convex parts are disposed at intervals around an axis of the first pin; and each of the first convex parts cooperates with one of the first concave parts.

* * * * *